US009396605B2

(12) United States Patent
Righetti

(10) Patent No.: US 9,396,605 B2
(45) Date of Patent: Jul. 19, 2016

(54) BEVERAGE VENDING MACHINES

(75) Inventor: Marco Righetti, Bologna (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1701 days.

(21) Appl. No.: 12/519,247

(22) PCT Filed: Dec. 18, 2006

(86) PCT No.: PCT/EP2006/012167
§ 371 (c)(1),
(2), (4) Date: Jun. 15, 2009

(87) PCT Pub. No.: WO2008/067843
PCT Pub. Date: Jun. 12, 2008

(65) Prior Publication Data
US 2010/0058931 A1    Mar. 11, 2010

(51) Int. Cl.
| A47J 31/40 | (2006.01) |
| G07F 13/06 | (2006.01) |
| A47J 31/52 | (2006.01) |
| A47J 31/36 | (2006.01) |

(52) U.S. Cl.
CPC .............. *G07F 13/065* (2013.01); *A47J 31/401* (2013.01); *A47J 31/3614* (2013.01); *A47J 31/52* (2013.01); *B67D 2210/00031* (2013.01)

(58) Field of Classification Search
CPC ..... A47J 31/42; A47J 31/3614; A47J 31/408; A47J 31/52; A47J 31/20; A47J 31/401; A47G 19/14; A61J 7/0084; B67D 1/0021; B67D 1/0082; B67D 3/0009; B05C 17/00553; A01C 15/16; A01C 15/00; B01F 13/1058; B29B 13/022; B65D 81/3283; B65D 81/3222

USPC ............ 99/286, 289 R, 288, 289 T, 280, 287;
700/231; 222/129.1, 145.6, 281, 129.4,
222/129.3, 146.1, 129, 144, 146.2, 146.4,
222/146.5, 145.1

See application file for complete search history.

(56) References Cited

U.S. PATENT DOCUMENTS

| 2,488,641 A | * | 11/1949 | Seawright .................... 108/94 |
| 2,505,369 A | * | 4/1950 | Stewart .................... 137/12.5 |
| 2,682,984 A | * | 7/1954 | Melikian et al. ................ 221/96 |
| 2,698,776 A | * | 1/1955 | Stoeckl ........................ 312/238 |
| 3,160,453 A | * | 12/1964 | Tassell ......................... 312/238 |
| 3,266,857 A | * | 8/1966 | Anderson ..................... 312/238 |
| 3,356,011 A | * | 12/1967 | Parraga ..................... 99/289 R |
| 3,413,909 A | * | 12/1968 | Heler .............................. 99/298 |
| 4,188,863 A | * | 2/1980 | Grossi ............................ 99/286 |
| 4,211,342 A | | 7/1980 | Jamgochian et al. |
| 4,333,587 A | | 6/1982 | Fessler |

(Continued)

FOREIGN PATENT DOCUMENTS

| FR | 2 631 802 | 12/1989 |
| FR | 2 883 089 | 9/2006 |

(Continued)

*Primary Examiner* — Dana Ross
*Assistant Examiner* — Hemant Mathew

(57) ABSTRACT

The vending machine includes a housing with an openable wall. In the housing, devices for the preparation of at least one beverage are arranged. At least some of the devices are supported by a supporting structure, which is pivotally arranged in the housing. Access to the devices through the openable wall is facilitated by pivoting the supporting structure around a pivoting axis.

32 Claims, 7 Drawing Sheets

(56) References Cited

U.S. PATENT DOCUMENTS

| | | | |
|---|---|---|---|
| 4,440,459 A * | 4/1984 | Hallgren | 312/238 |
| 4,456,148 A * | 6/1984 | Newman et al. | 221/132 |
| 4,480,764 A * | 11/1984 | Takagi et al. | 221/11 |
| 4,632,274 A * | 12/1986 | Garbe | 221/96 |
| 5,158,793 A * | 10/1992 | Helbling | 426/231 |
| 5,265,518 A | 11/1993 | Reese et al. | |
| 5,353,692 A * | 10/1994 | Reese et al. | 99/289 T |
| 5,403,079 A * | 4/1995 | Fetisoff | 312/204 |
| 5,772,072 A * | 6/1998 | Prescott et al. | 221/121 |
| 5,837,980 A * | 11/1998 | Henning | 219/753 |
| 5,839,610 A | 11/1998 | Reese et al. | |
| 5,941,163 A | 8/1999 | Park et al. | |
| 6,098,524 A | 8/2000 | Reese | |
| 6,131,399 A * | 10/2000 | Hall | 62/127 |
| 6,176,172 B1 * | 1/2001 | Stettes et al. | 99/289 T |
| 6,298,769 B1 * | 10/2001 | Stettes et al. | 99/289 R |
| 6,401,597 B1 | 6/2002 | Stettes et al. | |
| 6,453,799 B1 | 9/2002 | Kown | |
| 6,742,553 B2 | 6/2004 | Sato et al. | |
| 6,991,305 B2 * | 1/2006 | Gallea | 312/238 |
| 2004/0069795 A1 | 4/2004 | Sams | |
| 2004/0118294 A1 * | 6/2004 | Grassedonio | 99/279 |
| 2004/0129809 A1 * | 7/2004 | Siano et al. | 241/92 |
| 2006/0162569 A1 * | 7/2006 | Doglioni Majer | 99/275 |
| 2006/0169187 A1 * | 8/2006 | Hoffman | 108/103 |

FOREIGN PATENT DOCUMENTS

| | | | |
|---|---|---|---|
| GB | 2 155 907 | 10/1985 | |
| IT | WO 03/094681 | 11/2003 | |
| JP | 50137098 U | 11/1975 | |
| JP | 10172044 A | 6/1998 | |
| WO | WO 2005019093 A2 * | 3/2005 | B67D 1/04 |

* cited by examiner

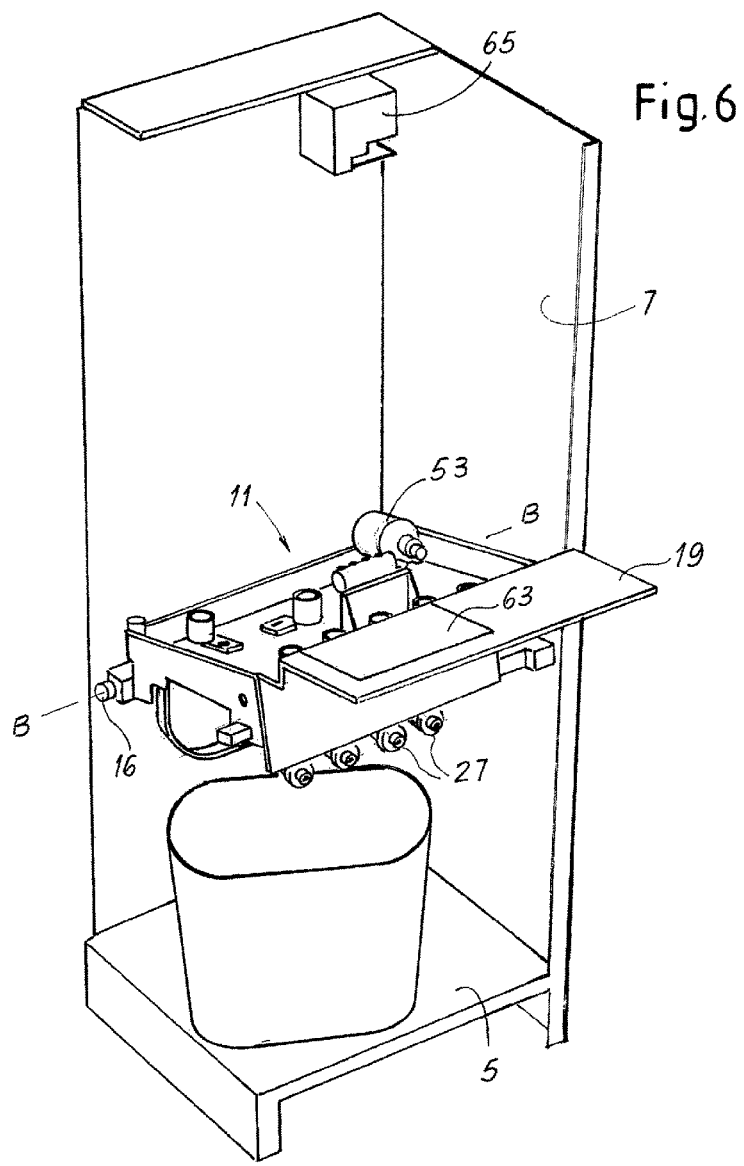

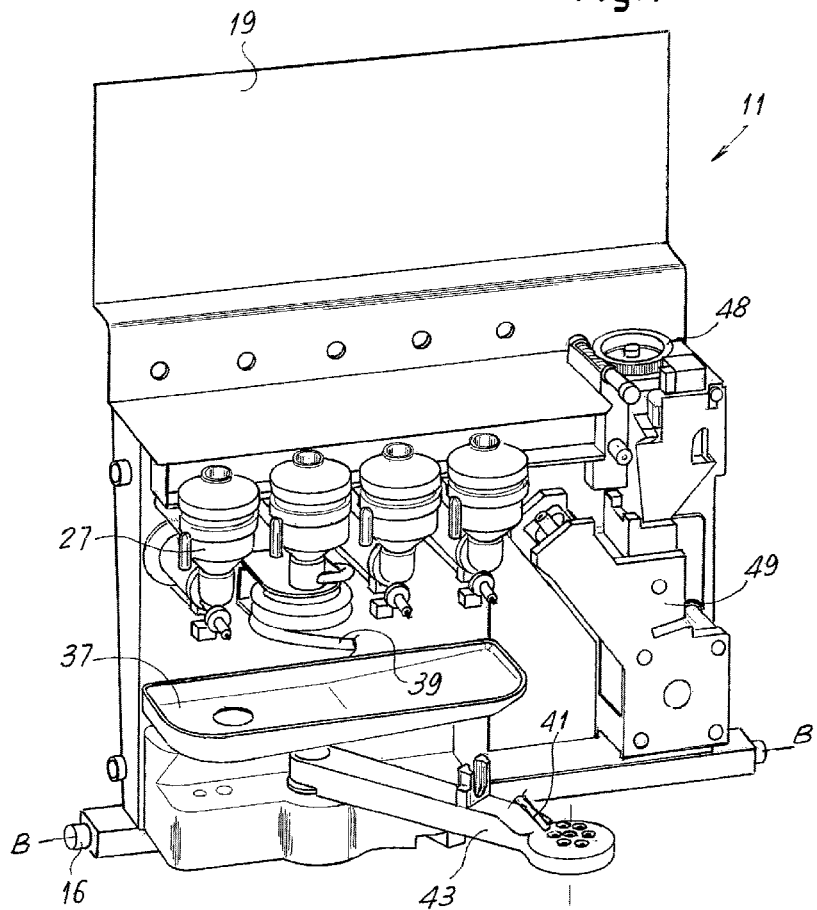

BEVERAGE VENDING MACHINES

TECHNICAL FIELD

The present invention relates to vending machines for edible products. According to a particular aspect, the present invention relates to improvements in beverage vending machines.

BACKGROUND ART

Vending machines are frequently used for the distribution of food and beverages in public premises, offices, factories, canteens, refectories and the like. Particularly popular are vending machines for dispensing cold and hot beverages, such as tea, coffee, milk, hot chocolate and the like. These machines are usually comprised of a cabinet with an openable front wall or a front door on which a user interface is provided. The user interface includes, buttons, light signaling devices, displays, keyboards, coin slots, card readers and the like, to allow the user to select a particular beverage, to control the dispensing process and to pay the relevant amount. An opening is usually provided in said front wall from which the user can take the cup containing the selected beverage at the end of the dispensing cycle.

Beverage vending machines are known e.g. from U.S. Pat. Nos. 6,453,799; 6,742,553; 5,839,610; 5,265,518; 6,401,597; 5,941,163; 6,098,524; 4,211,342.

Depending upon the kind of beverages for which the vending machine is designed, several facilities, apparatus and devices are housed in the cabinet. Typically, a set of dispensing nozzles are placed above a cup retention position, where a cup is placed each time a dispensing cycle is initiated by the user. Usually, cups are either dispensed from an automatic cups storage unit or are manually placed by the user.

The dispensing nozzles are connected to individual beverage preparation units. Each unit usually includes an ingredient container or hopper. In each said container or hopper an ingredient is contained, which is used to prepare a specific beverage. The beverage is produced for example by mixing a predetermined amount of said ingredient with hot water. The ingredient can be in powder form, grains, concentrated liquids or the like. In some cases the ingredient or product is a freeze-dried powder, which is dispensed by a metering device in a mixing bowl. Water, usually hot water, is added to the powder in the bowl and the powder is dissolved or suspended in the water to produce the desired beverage.

Vending machines usually also contain a coffee brewing unit. The brewing unit is equipped with one or more coffee containers. Each coffee container can contain a different kind of coffee. In some vending machines a first hopper for decaffeinated coffee beans is combined with a normal coffee beans hopper. This allows the user to select alternatively a normal coffee or a decaffeinated coffee.

Electric motors, electro-valves and at least one water boiler and usually pumping means are housed in the cabinet of the vending machine to prepare and dispense the selected beverage upon request. Logic electronic components, such as a microprocessor, and power electronic components, are also provided to control the beverage preparation cycle and to exchange information and commands with the user. Additionally, a sugar dispenser, a spoon dispenser and other facilities and devices, such as payment systems, card readers and the like are provided inside the vending machine.

These machines are subject to periodical inspection, maintenance, filling of the ingredient or product containers and reservoirs as well as to cleaning and to interventions in case of malfunctioning of the mechanical, electrical and electronic parts of the machine.

Inspection, maintenance, cleaning or repairing interventions require access to the various parts of the vending machine. Access to the interior of the vending machine is usually achieved by opening the front panel or wall of the machine. Some of the devices mentioned above, such as typically the cup dispenser, sugar dispenser and spoon dispenser are supported by the openable front wall. Other devices housed inside the vending machine are more difficult to be accessed by the personnel in charge of maintenance, cleaning and repair of the machines.

OBJECTS AND SUMMARY OF THE INVENTION

An object of the present invention is to provide a vending machine, and specifically though not exclusively a beverage vending machine, wherein access to the parts requiring intervention or maintenance is easier.

An object of a particularly advantageous embodiment of the invention is to provide a beverage vending machine, and in particular though not exclusively a hot beverage vending machine, which allows a better and easier access to some at least of the inner mechanical and/or electronic or electric facilities, apparatus, components or devices.

According to an embodiment of the invention, in a vending machine comprised of a housing with an openable wall, in which devices for the preparation of beverages are housed, at least some of said devices are supported by a supporting structure. Advantageously said supporting structure is pivotally arranged in said housing, such that access to said devices through said openable wall is facilitated by pivoting said supporting structure around a pivoting axis.

The term device encompasses any apparatus, component, structure, means, facility or the like, of mechanical, hydraulic, electric, electronic or other nature, intended for or contributing to the operation of the vending machine. Some of the following devices can be connected to said supporting structure: one or more containers for beverage ingredients; dispensing devices, for dispensing metered amounts of ingredients from each container to a beverage-preparation apparatus; mixing bowls forming part of said beverage-preparation apparatus; water pumps, valves and actuators; water boilers or heaters; electronic boards including logic or power components of the electronic circuit; coffee brewing units; water reservoirs and devices for replenishing said water reservoir and/or said boiler(s).

According to a particularly advantageous embodiment of the invention, the supporting structure is pivotally arranged about a substantially vertical axis, such that the entire supporting structure can be easily rotated by 90° or 180° or more about said substantially vertical axis without the need for removing or emptying the containers, water reservoirs or boilers. This makes machine maintenance end service much easier and faster, since rapid and complete access to various electronic, electric, mechanical and hydraulic components can be gained by simply rotating the supporting structure without any preliminary dismantling and/or emptying operation. Once the intervention has been completed, the machine can be very quickly placed in its operating condition again, without the need to re-mount or re-fill any container, boiler or tank.

In a particularly advantageous embodiment, the supporting structure can be provided with a substantially vertical movement, i.e. with the capability of being moved up and down.

This makes servicing easier, in particular as far as re-filling of the ingredient containers is concerned. Also, access to the various parts and components of the machine for cleaning, maintenance or repair is made easier. Vertical movement can be provided also in a non-pivoting supporting structure.

Use of a supporting structure pivoting around a vertical axis provides additional advantages in that the machine can be put into operation with the pivoting supporting structure arranged in its rotated position, i.e. with the devices supported on its back side facing the operator. This allows easy checking proper operation of the various instrumentalities and devices located on both sides of the supporting structure.

The above and further objects, features and advantages of the present invention will become more apparent by the following description and accompanying drawings, which show practical non limiting embodiments of the invention, which are provided for illustration purposes and not as a limitation of the scope of the invention.

BRIEF DESCRIPTION OF THE DRAWINGS

More specifically, in the drawings:

FIG. 6 shows a perspective view of the vending machine according to FIG. 4, with the supporting structure pivoted in a horizontal position; and FIG. 7 shows a detail of the supporting structure of the vending machine of FIG. 5, and relevant components supported thereon.

DETAILED DESCRIPTION OF EMBODIMENTS OF THE INVENTION

The following description and the drawings are limited to those parts of the vending machine which are important for a throughout understanding of the present invention. Other parts, which are common to usual vending machines and do not concern the novel features of the invention, are not discussed in detailed and are known to those skilled in the art.

Figure 1:
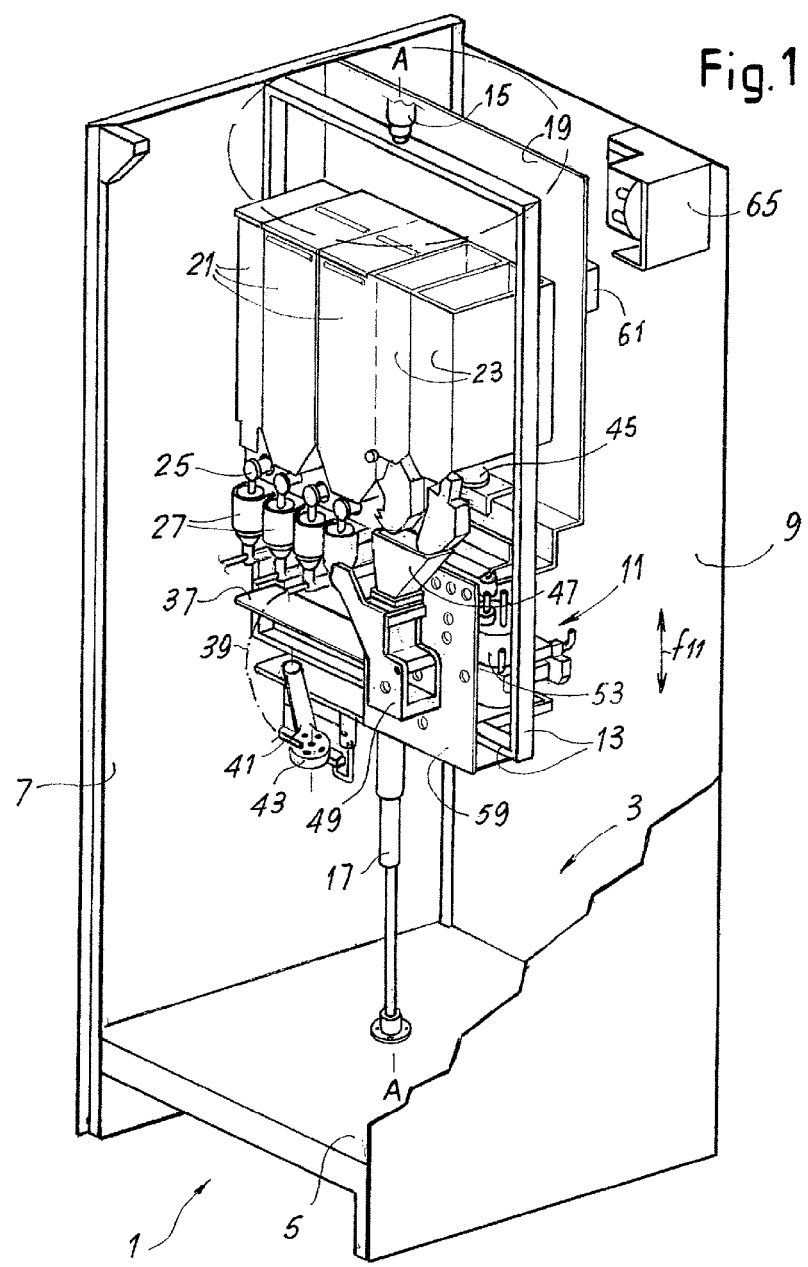
FIG. 1 shows a perspective view, with broken and removed parts, of a vending machine according to a first embodiment of the invention.
Figure 2:
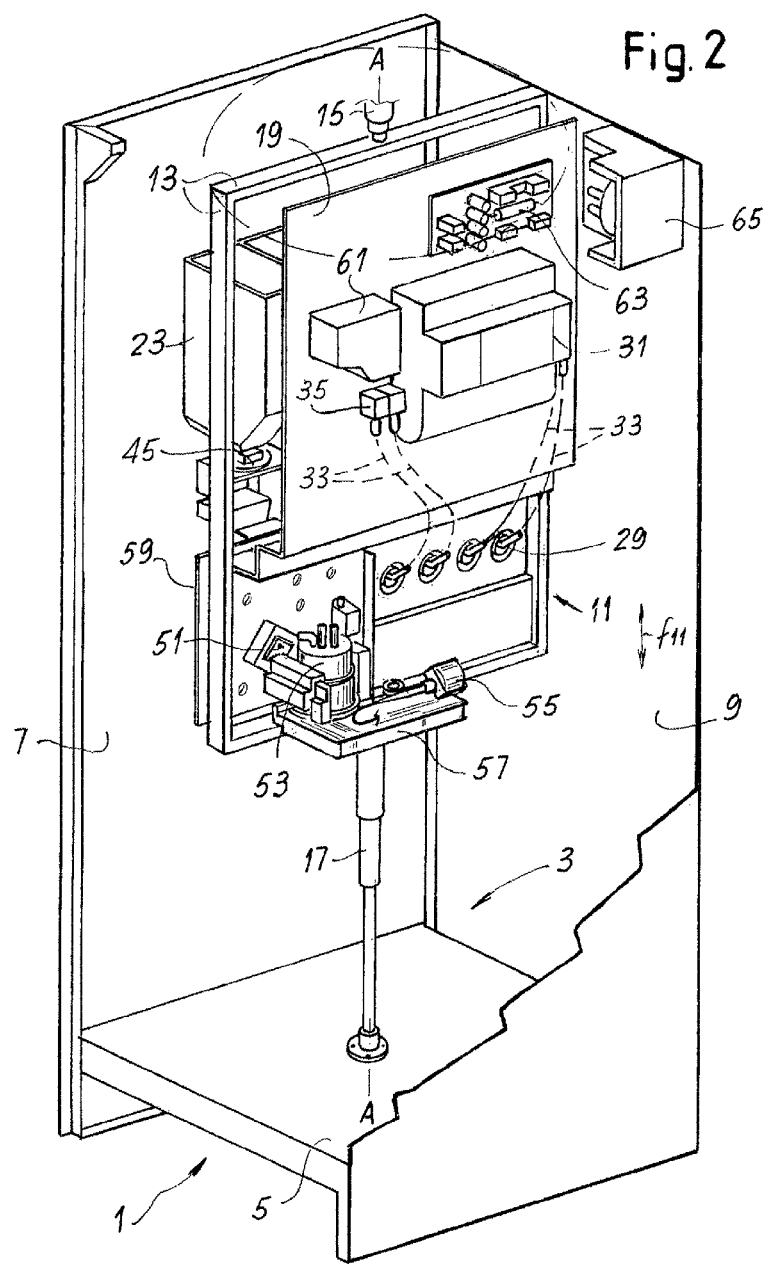
FIGS. 2 and 3 show perspective views of the vending machine in FIG. 1, in two different positions of the supporting structure.
Figure 3:
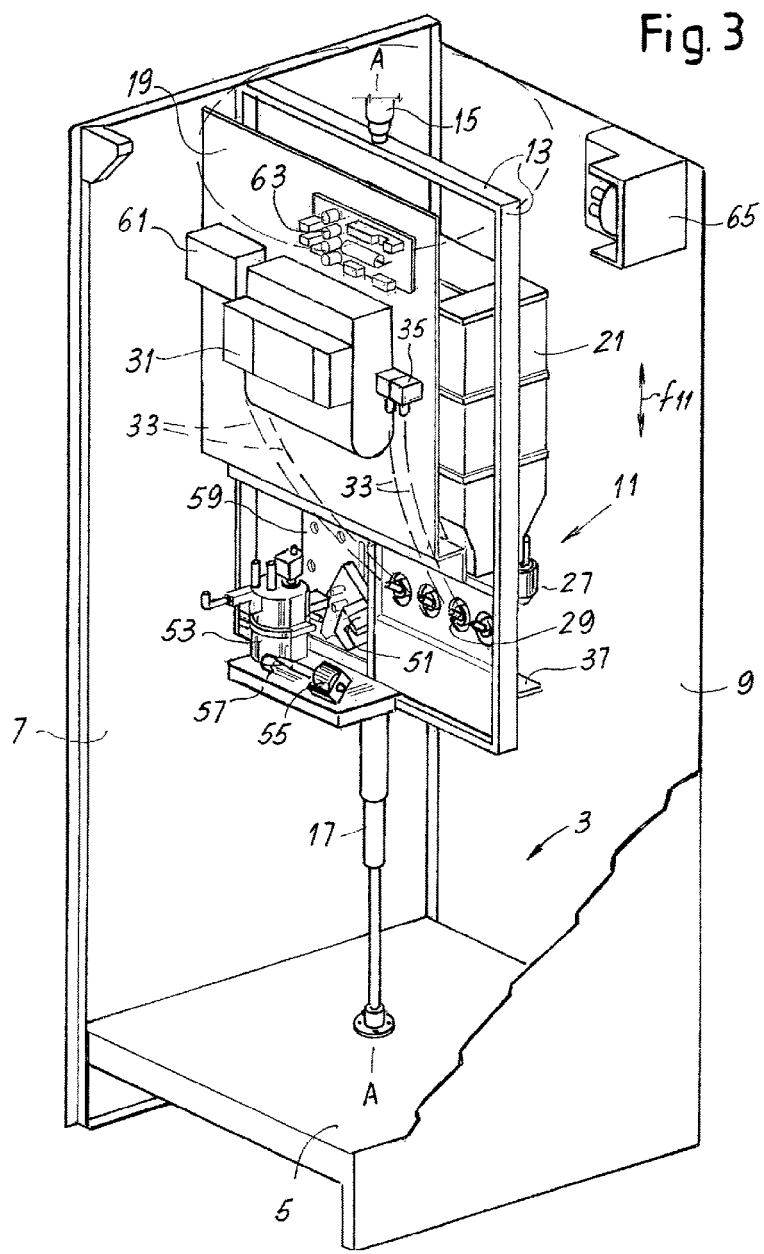
Figure 4:
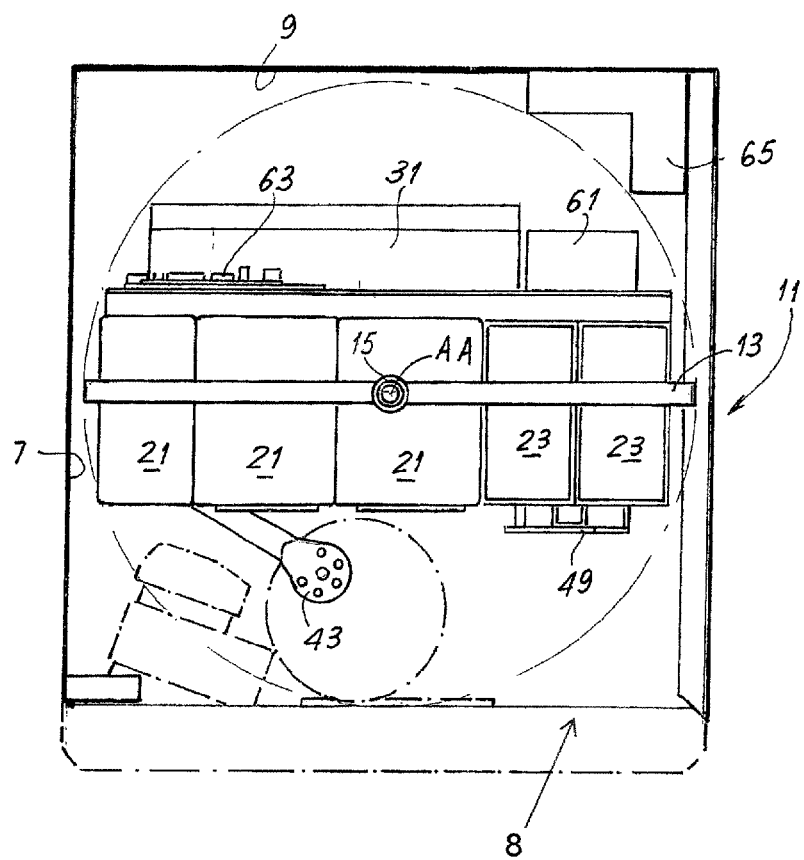
FIG. 4 shows a top plan view of the vending machine of FIGS. 1 to 3.
Figure 5:
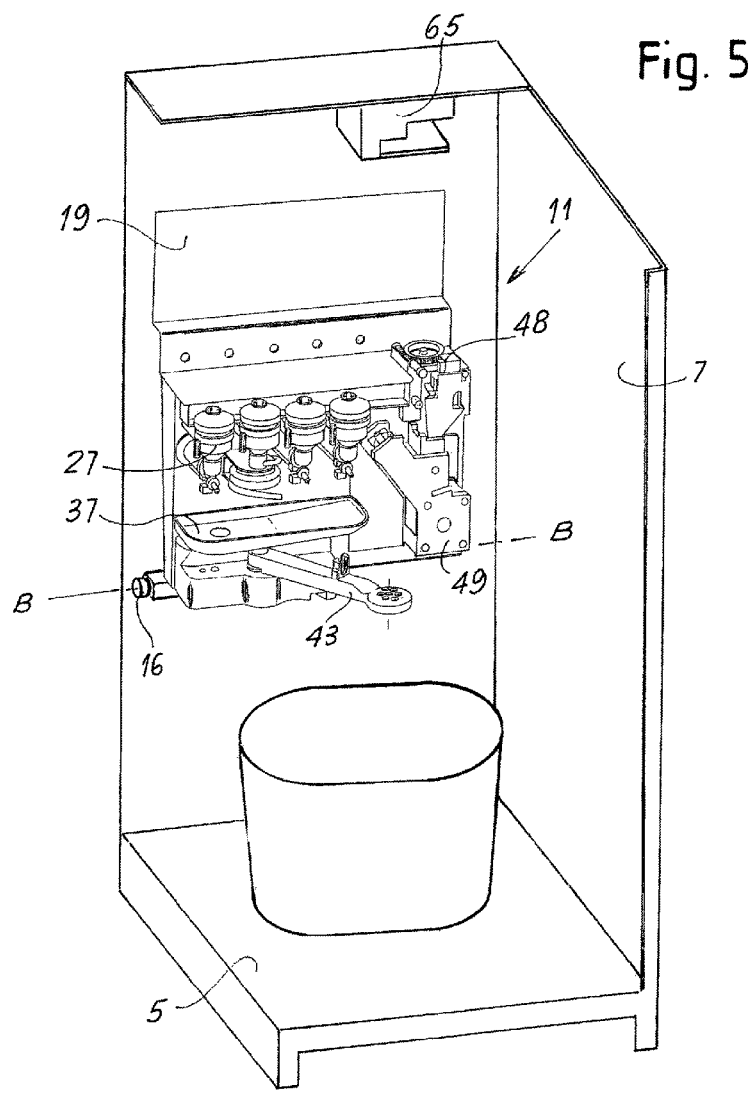
FIG. 5 shows a perspective view, with broken and removed parts, of a vending machine according to a second embodiment of the invention.

FIGS. 1 to 4 show a vending machine 1 with a housing 3. In FIGS. 1, 2 and 3 the front openable panel or wall, a side wall and the ceiling have been removed to show the interior of the machine. Reference 5 designates a base of the housing, to which vertically extending side wall 7 and a back wall 9 are connected. FIG. 5 shows the front door, i.e. the openable panel or wall 8.

According to an embodiment of the invention, a supporting structure 11 is arranged inside the housing 3. In a preferred embodiment of the invention, the supporting structure 11 includes a rectangular frame 13, which is connected to a top shaft 15 and a bottom shaft 17. The top shaft can be supported to the ceiling of the housing 3 and the bottom shaft 17 to the base 5. Shafts 15 and 17 are coaxial and define a pivoting axis A-A about which the supporting structure 11 can rotate. In an alternative embodiment the supporting structure can be connected to the base 5 or to the ceiling only. However, the double shaft connection to both the ceiling and the base is preferred, since it results in a more stable and rigid construction.

In a preferred embodiment, the shafts 15 and 17 are telescopic such that the supporting structure 11 can be moved up and down according to double arrow f11 for the purposes to be described later on. The vertical movement can be controlled by a pair of cylinder-piston actuator housed inside the telescopic shafts, or a single actuator housed inside one of said shafts 15, 17, or by an external actuator. In a modified embodiment, movement can be manually actuated and counterweights, springs or the like can be provided to make the movement easier.

In a possible embodiment of the invention, a plate 19 is rigidly mounted on the frame 13. The plate 19 can be made of one or more metal sheets, to form a mounting structure on which several mechanical, electrical, electronic and hydraulic devices are connected as disclosed here below.

In a preferred embodiment of the invention the supporting structure 11 supports a plurality of storage containers or hoppers 21 for containing ingredients for the production of different beverages. Different ingredients can be stored in a different number of containers, depending upon the kind of beverages, which the vending machine 1 is able to produce. For example, soluble tea, coffee, milk and chocolate can be stored in form of powder in containers 21. In a preferred embodiment of the invention the vending machine also includes one or more containers 23 for the storage of coffee beans.

In a preferred embodiment, each storage container 21 includes a dispensing device 25 arranged on the bottom of the container. Said dispensing device 25 can include a metering screw, a rotating distributor or the like. A corresponding electric motor (not shown) controls each dispensing device 25.

The ingredient dispensed by each dispensing device is collected in one of a plurality of mixing bowls 27 arranged underneath the dispensing devices 25. In a preferred embodiment, each mixing bowl is provided with a mixing motor 29. In a preferred embodiment, both the mixing bowls and the motors are supported by the supporting structure 11. In the mixing bowls 27 the ingredients dispensed from the relevant container 21 are mixed with hot water. In a preferred embodiment, the hot water is fed by a boiler 31 supported on the back side of the plate 19. Water pipes 33 feed water to each mixing bowl. An electro-valve 35 or any other suitable intercepting device, such as a pinching valve, is provided on each water feed pipe 33. The valves 35 are controlled in such a way that water is fed only in the mixing bowl where an ingredient has been dispensed based on the commands and instructions imparted by the user.

A collecting tray 37 is placed underneath the mixing bowls for collecting water or ingredients accidentally escaping from the containers and/or the mixing bowls. Each mixing bowl is connected by means of a flexible pipe 39 to a corresponding beverage dispensing nozzle 41 supported by a nozzle supporting arm 43. When the front panel 8 of the vending machine is closed and the supporting structure 11 is in the operating position, the nozzle supporting arm 43 is positioned such that the nozzles are arranged above a cup retention device, in which a cup is fed each time a beverage is required by the user.

In a preferred embodiment of the invention, the vending machine is designed to produced brewed coffee from coffee beans contained in containers 23. A coffee grinding device or a pair of coffee grinding devices 45 are placed underneath the containers 23 to grind the coffee beans and produce a coffee powder upon selection by the user. Decaffeinated coffee beans and normal coffee beans can be separately stored in the two containers 23, such that the user can alternatively select a decaffeinated coffee or a normal coffee. The coffee powder produced by the grinding device is fed through a hopper 47 to a coffee brewing unit 49. The coffee brewing unit is provided with an electric motor 51 and is supported on a plate 59 connected to the supporting structure 11.

In a preferred embodiment, behind the coffee brewing unit 49 a second water boiler 53 is provided, specifically designed to feed pressurized hot water to the coffee brewing unit 47. The pressurized water boiler 53 is combined to a water pump, such as a membrane pump 55. In a preferred embodiment of the invention, the boiler 53 and the pump 55 are supported by a shelf 57, rigidly connected to the frame 13. Motor 51, boiler 53, pump 55 and shelf 57 are arranged on the side of the supporting structure 11 opposite the containers 21, 23. When the vending machine is in its operating position (FIGS. 1 and 4) with the front wall 8 closed, the containers 21, 23 are on the side of the supporting structure 11 facing the front wall 8, herein after also called the front side of the supporting structure, while the motor 51, the boilers 53 and 31, the pump 55 and the shelf 57 are arranged on the opposite side of the supporting structure, herein after also called the back side of the supporting structure.

According to an embodiment of the invention, on the back side of the supporting structure a water reservoir 61 (air break) is also provided, containing a cold water supply for the boiler 31. The water reservoir 61 is connected via a valve (not shown) to a pressurized water supply line. The valve is electronically controlled to open and close depending on the level of water in the water reservoir 61, detected via a float switch. Via water pipes, not shown, the water reservoir 61 supplies water to boiler 31 and to boiler 53, such that the water pressure inside boilers 31, 53 is substantially equal to the ambient pressure and that air is prevented from entering the boilers.

In a preferred embodiment of the invention electronic circuitry 63 is also provided on the back side of the supporting structure 11. In an embodiment the electronic circuitry 63 contains power electronic components, while logic components, such as inter alia a microprocessor unit for managing the operation of the vending machine, can be arranged on a fixed wall or on the openable wall of the housing. In an alternative embodiment, the logic electronic components are also mounted on the supporting structure 11. In an embodiment of the invention, transformers, fuses and other powering devices are arranged on the back wall 9 of the housing 3.

When the vending machine is in a closed condition (FIG. 4) the supporting structure 11 is placed with its front face facing the openable front panel or wall 8 of the housing 3, such that the dispensing nozzles 41 are located in the correct position to dispense the required beverage. When the vending machine requires servicing, e.g. if one or more of the containers 21, 23 must be re-filled with the respective ingredients, the front wall can be opened to access the containers 21, 23. In order to facilitate re-filling, according to a preferred embodiment of the invention the supporting structure 11 can be lowered according to arrow f11 by means of the telescopic shafts 15, 17, such that the servicing personnel can more easily access the top opening of the containers 21, 23 and replenish them as required.

To inspect the various electric, electronic, hydraulic and/or mechanical parts of the vending machine, such as in case of malfunctioning, for cleaning purposes or just for the sake of periodical checking of the various machine components or devices, the personnel can easily reach the various devices by rotating the supporting structure 11 (FIGS. 2 and 3) and also by lowering it, if required. All the mechanical, electrical and electronic parts, as well as the hydraulic components arranged on or accessible from the back side of the structure 11 can thus be placed in a position facing the access opening of the housing (FIG. 3). Optimum access is thus achieved for the purpose of checking, cleaning, repairing or replacing all parts of the machine, without the need to dismantle or remove additional portions of the housing.

Advantageously, access to the back side and/or to the lateral areas of supporting structure 11 and to the parts supported thereon can be achieved without removing the containers 21, 23. This enormously simplifies maintenance, assistance and repairing of the various parts of the vending machine.

Some of the above advantages can also be achieved with an embodiment of the invention shown in FIGS. 5 to 7, including a supporting structure which is pivoting about a horizontal axis B-B. Parts and components which are identical or similar to those of the previously described embodiment are designated with the same reference numbers. In this embodiment the containers 21, 23 must be removed from the supporting structure 11 before the latter can be rotated by 90° about hinge axis B-B. Therefore access to the back side of the supporting structure 11 is less handy than in the embodiment of FIGS. 1 to 4. Also, some of the devices and components on the supporting structure 11, namely those located nearer to the axis B-B, are less readily accessible from the outside, while in the previously described embodiment all components are brought near to the opening in the housing 3 by simple rotation about axis A-A.

A vertical up and down movement of the supporting structure 11 and axis B-B thereof is not excluded, e.g. by providing sliding bearings for a hinge shaft, 16.

The invention claimed is:

1. A vending machine comprising:
   a housing provided with an openable wall and containing devices for preparation of at least one beverage; and
   a supporting structure pivotally arranged in said housing, wherein said supporting structure supports said containing devices that contain ingredients for the preparation of said at least one beverage, a beverage-preparation apparatus, a water boiler, mixing bowls for mixing the ingredients with water from the water boiler and beverage feeding nozzles,
   wherein access to said containing devices supported by said supporting structure through said openable wall is facilitated by rotationally pivoting said supporting structure including said containing devices around a longitudinal axis along a length of the housing for rotation of the supporting structure about the longitudinal axis
   wherein the longitudinal axis extends through a center of the housing, and
   wherein each beverage feeding nozzle of the beverage feeding nozzles is configured to correspond to a mixing bowl of the mixing bowls and to a containing device of the containing devices.

2. The vending machine according to claim 1, wherein said containing devices are arranged on said supporting structure such that the machine can be put into operation with the supporting structure arranged in a rotated position, wherein the supporting structure is arranged in the rotated position by the rotational pivoting of the supporting structure, and wherein the containing devices face away from the openable wall of said housing in the rotated position.

3. The vending machine according to claim 1, wherein said supporting structure can pivot to rotate about said longitudinal axis by an angle of at least 90°.

4. The vending machine according to claim 1, wherein said supporting structure can pivot to rotate about said longitudinal axis by an angle of at least approximately 180°.

5. The vending machine according to claim 1, wherein said containing devices include a first set of containers for a plurality of ingredients, said first set of containers being supported by said supporting structure.

6. The vending machine according to claim 5, wherein said containing devices include a second set of containers for a plurality of further ingredients, said second set of containers being supported by said supporting structure.

7. The vending machine according to claim 5, wherein said first set of containers are supported on a front side of said supporting structure, facing the openable wall of said housing when the vending machine is in an operating condition, wherein the operating condition is when the openable wall of said housing is closed.

8. The vending machine according to claim 5, wherein each container of said first set of containers is combined with a mixing bowl of the mixing bowls, wherein at least one ingredient from each container of said first set of containers is dispensed in the mixing bowl and mixed with water, and the at least one beverage is fed from the mixing bowl to the beverage feeding nozzle of the beverage feeding nozzles.

9. The vending machine according to claim 6, wherein each container of said second set of containers is combined with a mixing bowl of the mixing bowls, in which at least one ingredient from each container of said second set of containers is dispensed and mixed with water, and the at least one beverage is fed from the mixing bowl to the beverage feeding nozzle of the beverage feeding nozzles.

10. The vending machine according to claim 8, wherein said mixing bowl is supported by said supporting structure.

11. The vending machine according to claim 5, wherein said first set of containers is removably connected to said supporting structure.

12. The vending machine according to claim 6, wherein said second set of containers is removably connected to said supporting structure.

13. The vending machine according to claim 5, wherein said supporting structure can be pivoted to rotate around said longitudinal axis while said first set of containers is attached to said supporting structure.

14. The vending machine according to claim 6, wherein said supporting structure can be pivoted to rotate around said longitudinal axis while said second set of containers is attached to said supporting structure.

15. The vending machine according to claim 1, further comprising a coffee brewing unit supported by said supporting structure.

16. The vending machine according to claim 15, wherein said coffee brewing unit is arranged on a front side of said supporting structure, facing the openable wall of said housing when the vending machine is in an operating condition, wherein the operating condition is when the openable wall of said housing is closed.

17. The vending machine according to claim 1, wherein said supporting structure is mounted on at least one shaft supported by a ceiling or a base of said housing.

18. The vending machine according to claim 1, wherein said water boiler is arranged on a back side of said supporting structure, facing away from said openable wall of said housing when the vending machine is in an operating condition, wherein the operating condition is when the openable wall of said housing is closed.

19. The vending machine according to claim 1, further comprising a second water boiler supported by said supporting structure.

20. The vending machine according to claim 19, wherein said second water boiler is arranged on a back side of the supporting structure, facing away from said openable wall of said housing when the vending machine is in an operating condition, wherein the operating condition is when the openable wall of said housing is closed.

21. The vending machine according to claim 1, wherein said supporting structure is vertically movable.

22. The vending machine according to claim 1, further comprising a water reservoir connected to said water boiler.

23. The vending machine according to claim 22, wherein said water reservoir is supported by said supporting structure.

24. The vending machine according to claim 23, wherein said water reservoir is arranged on a back side of said supporting structure, facing away from said openable wall of said housing when the vending machine is in an operating condition, wherein the operating condition is when the openable wall of said housing is closed.

25. The vending machine according to claim 1, wherein said supporting structure supports an electronic board configured to control the vending machine.

26. The vending machine according to claim 5, wherein said supporting structure supports an electronic board for controlling the vending machine, said electronic board being arranged on the side of said structure opposite said first set of containers.

27. The vending machine according to claim 1, wherein said supporting structure is connected to a telescopic shaft connected to a center of a top or bottom wall of the housing.

28. The vending machine according to claim 1, wherein said supporting structure is connected to upper and lower substantially coaxial telescopic shafts connected to top and bottom walls of the housing.

29. The vending machine according to claim 1, wherein said supporting structure includes a supporting frame and at least a plate mounted on said frame.

30. The vending machine according to claim 1, wherein:
said housing includes an access opening closable by a closing front panel,
said supporting structure includes a plate having a first side and a second side,
the containing devices and the container are arranged on said first side,
the water boiler is arranged on said second side opposite said first side,
when the machine is in an operating position, said first side faces said closing front panel, and
when the machine is in a rotated position, said supporting structure is rotationally pivoted around said longitudinal axis causing said second side to face said access opening.

31. The vending machine according to claim 1, wherein said supporting structure supports at least one coffee grinding device.

32. The vending machine according to claim 1, further comprising tubes and a nozzle supporting arm for supporting the beverage feeding nozzles, wherein each tube of the tubes connects each beverage feeding nozzle to the mixing bowl of the mixing bowls, and wherein the nozzle supporting arm is arranged above a cup retention device.

\* \* \* \* \*